United States Patent
Kasten

[11] 3,796,025
[45] Mar. 12, 1974

[54] ABSORPTIVE DRYER HAVING OIL MIST ELIMINATING APPARATUS

[75] Inventor: Walter Kasten, Franklin, Mich.

[73] Assignee: The Bendix Corporation, South Bend, Ind.

[22] Filed: Dec. 23, 1971

[21] Appl. No.: 211,235

[52] U.S. Cl............ 55/316, 55/213, 55/302, 55/330, 55/387, 55/419, 55/DIG. 17
[51] Int. Cl............................... B01d 50/00
[58] Field of Search........ 55/DIG. 17, DIG. 25, 316, 55/318, 319–321, 323, 337, 387–388, 219, 419, 302, 213, 329–330

[56] References Cited
UNITED STATES PATENTS

| | | | |
|---|---|---|---|
| 1,785,331 | 12/1930 | Spencer | 55/329 |
| 3,721,069 | 3/1973 | Walker | 55/319 |
| 3,705,480 | 12/1972 | Wireman | 55/323 X |
| 3,347,026 | 10/1967 | Zankey | 55/321 X |
| 2,848,060 | 8/1958 | McBride et al. | 55/DIG. 25 |
| 3,676,987 | 7/1972 | Wunder et al. | 55/DIG. 25 |
| 3,616,617 | 11/1971 | De Groote | 55/DIG. 25 |
| 2,698,061 | 12/1954 | Jaubert | 55/316 |
| 2,096,851 | 10/1937 | Fricke | 55/319 |
| 3,464,186 | 9/1969 | Hankison et al. | 55/316 X |
| 3,680,283 | 8/1972 | Jones | 55/387 X |
| 3,252,270 | 5/1966 | Pall et al. | 55/318 X |
| 1,811,597 | 6/1931 | Steinbart | 55/419 X |

Primary Examiner—Frank W. Lutter
Assistant Examiner—Vincent Gifford
Attorney, Agent, or Firm—Ken C. Decker; William N. Antonis

[57] ABSTRACT

An absorptive dryer for a compressed air brake system having a desiccant material for removing moisture from air in the brake system. A filter is disposed upstream from the desiccant material to prevent contamination of the desiccant, and a coalescer is disposed upstream from the filter to coalesce any oil mist particles in the brake system to at least a sufficiently large size to be readily removed from the air by the filter. In order to minimize contamination of the filter, the coalescer and filter elements are positioned in the embodiments illustrated herein so that many of the coalesced oil droplets are removed by gravity from the air flow and do not reach the filter element.

1 Claim, 4 Drawing Figures

INVENTOR
WALTER KASTEN

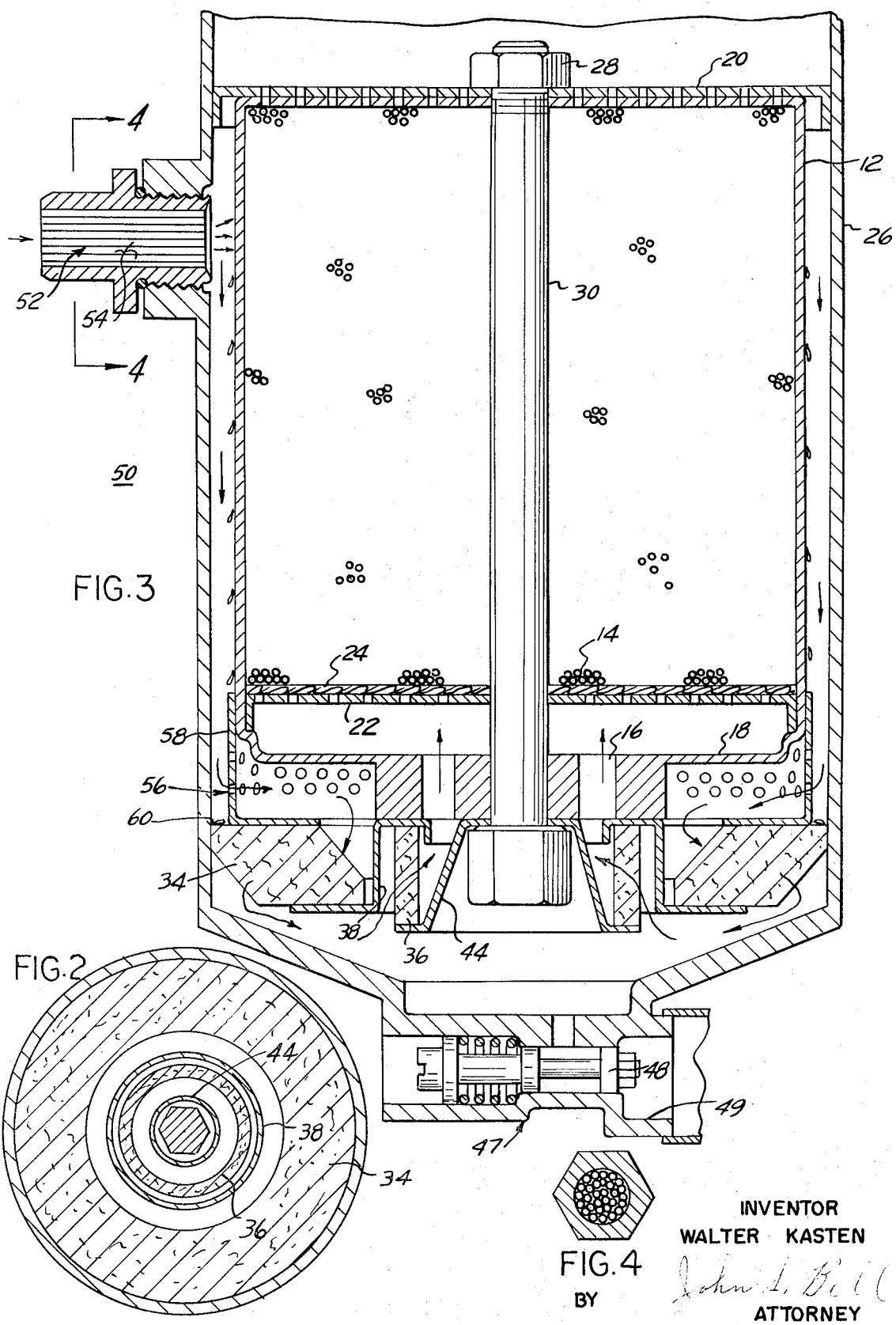

ABSORPTIVE DRYER HAVING OIL MIST ELIMINATING APPARATUS

BACKGROUND OF THE INVENTION

1. Field of the Invention

Air dryers for compressed air brake systems.

2. Brief Description of the Prior Art

Air brake systems include a compressor which receives air from the atmosphere and compresses that air, a filter for removing contaminant particles from the compressed air, a dryer for removing water vapor from the compressed air, a reservoir for storing the compressed air, and the air operated brakes. The dryer normally comprises a desiccant consisting of molecular sieve pellets having a large number of submicroscopic cavities or pores. As long as the pores do not become clogged by nondesorbable molecules that are larger than water molecules, the desiccant will absorb and thus remove water vapor from the air. Further, the desiccant has an extremely long operating life because it will release water when subjected to a reverse air flow.

Unfortunately, most air compressors use oil lubricated piston rings and some of the lubricating oil is transmitted to the compressed air in the form of a fine mist or aerosol. In addition, the air compressors in most motor vehicle air brake systems are located adjacent to the vehicle engine. The compressor receives air from the engine compartment which is often saturated with oil mist. Compressed air brake systems for motor vehicles are thus further contaminated by crank case blow-by vapors from the vehicle engine.

As stated previously, the prior art systems include a filter such as a pleated paper filter between the compressor and the desiccant material. While these filters effectively trap solid contaminating particles, the oil mist and aerosol particles — most of which are smaller than 1 micron in diameter — pass readily through the filter to the desiccant material. These oil particles are nondesorbable molecules that are larger than water molecules and will therefore readily clog the pores of the desiccant pellets and prevent the pellets from absorbing water vapor. This oil contamination of the desiccant material limits the life of the air dryer. Further, the contaminating oil particles are not released from the desiccant material by a reverse air flow. The prior art has not recognized that it is this oil mist contamination that limits the life of the absorptive dryer. The prior art has also not recognized the ineffectiveness of filters such as pleated paper filters in removing oil vapors from the air flow in an air brake system.

SUMMARY OF THE INVENTION

This invention comprises an air dryer for a compressed air brake system that includes a coalescer and a filter disposed upstream from a desiccant material. The coalescer and filter cooperate to remove oil mist from the air flow and thus prevent the oil mist from contaminating the desiccant material. The coalescer and filter elements of the embodiments illustrated herein are annular elements with the filter disposed within the core of the coalescer to provide a compact unit. The coalescer and filter elements are disposed above an oil collecting sump. Air flows first through the coalescer, then through the filter, and then through the desiccant material. The coalescer increases the size of the oil mist particles and droplets so that a large number of these particles and droplets are removed from the air flow by gravity. Air is directed to flow through the desiccant material in a direction generally away from the filter in order to maximize the flow path between the coalescer and filter element and thereby maximize the opportunity for coalesced oil droplets to be removed by gravity from the air flow. The remaining oil particles have a size such that they are removed from the air flowing to the desiccant material by the filter. The filter can be readily cleaned by a reverse air flow.

In one embodiment illustrated herein, some oil is removed from the air flow by impact filtering at a point above the coalescer element. A wall directs this oil to flow through the coalescer along a vertical path at a position where the coalescer element has a short vertical dimension. The resistance encountered by this oil is therefore minimized. However, only a small opening is provided to the short vertical path, and the major portion of the air received by the dryer is directed through the coalescer along a long horizontal path in order to maximize the coalescence of oil mist particles by the coalescer.

BRIEF DESCRIPTION OF THE DRAWINGS

Further objects, features and advantages of this invention, which is defined by the appended claims, will become apparent from a consideration of the following description and the accompanying drawings in which:

FIG. 2 is a plan cross section of the device of FIG. 1 cutaway and viewed along line 2—2 to illustrate the shape of the coalescer and filter elements shown in FIG. 1;

FIG. 3 is a cutaway, plan view of a second absorptive dryer that also includes impact filtering means for removing oil mist from the air flow;

FIG. 4 is a cross section of the impact filtering apparatus of FIG. 3 cutaway along line 4—4.

DETAILED DESCRIPTION OF THE PREFERRED EMBODIMENTS

Figure 1:
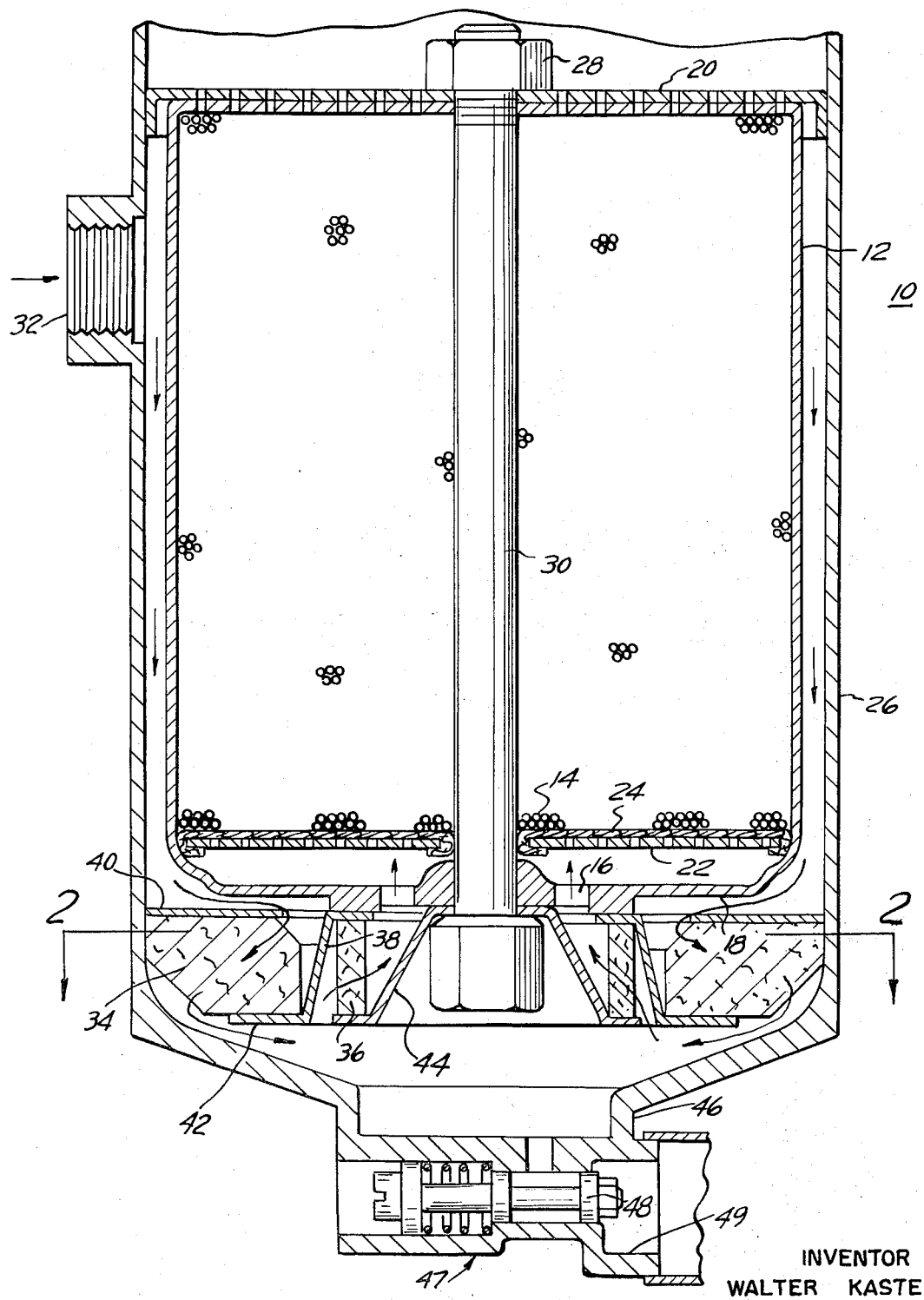
FIG. 1 is a schematic, plan, cutaway view of an absorptive dryer having coalescer, filter, and desiccant elements.

FIG. 1 illustrates an absorptive dryer 10 that includes a cylindrical inner housing 12 for holding pellets 14 of a desiccant material. In order to allow air to flow through the desiccant material, an annular opening 16 is formed in end wall 18 of cylindrical housing 12, and wall 20 opposite end wall 18 is perforated. The pellets 14 of desiccant material are held and prevented from falling out of the cylindrical housing 12 by a perforated element or floor 22 which is covered by a porous material such as a sitff cloth 24. While the cylinder 12 will normally be filled with desiccant pellets in a typical operating embodiment, only a few of those pellets are illustrated in FIG. 1 in order to simplify the drawing. Cylindrical housing 12 is held in a larger, outer cylindrical housing 26 by a nut 28 and bolt 30. An inlet port 32 is formed in the side of housing 26 so that air, such as air from the compressor in an automobile brake system, can be introduced into the space between the two housings 12 and 26.

An annular coalescer element 34 (also shown in FIG. 2) is disposed beneath housing 12 to receive air from port 32 and coalesce any oil mist particles in that air into larger droplets. The coalescer element 34 may comprise any suitable coalescer material such as a resin impregnated fiberglass bat. An appropriate fiberglass bat is formed by wrapping layers of resin coated fiberglass around a mandrel and then subjecting the fiberglass to heat to cure the resin binder. The cured fiberglass is then cut to a cylinder having a desired thickness and inner and outer diameters. Different densities of fiberglass material may be used to provide coalescer elements of various densities that coalesce oil mist particles into droplets of different sizes. An annular filter element 36 such as a ribbon-edge type filter element is disposed within the core of coalescer element 34.

Coalescer element 34 abuts housing 26, and is held in that housing by a cup-shaped washer 38. The walls of the washer 38 are impervious to air so that all air received by the dryer 10 must flow through the coalescer 34. An impervious metal surface 40 contacts the top of coalescer element 34, and one surface 42 of washer 38 contacts the bottom of that element so that air flows through the coalescer along a substantially horizontal path. Impervious surfaces 40 and 42 maximize the length of the air flow path through coalescer element 34 and thus maximize the effect that the coalescer has on received air. Filter element 36 is held within the core of coalescer element 34 by a cup-shaped fitting 44. The walls of fitting 44 are impervious to air so that all air must pass through the filter 36 in order to reach the drying desiccant material held in housing 12. Filter 36 removes both solid particles and coalesced oil droplets that do not have sufficient weight to be pulled by gravity from the air flow. A sump 46 for collecting oil removed from the air flow is located beneath coalescer 34 and filter 36. A purge valve 47 communicates with sump 46 to permit the draining of oil from that sump. Purge valve 47 includes a spring operated closure element 48 which can be opened to permit oil to flow from sump 46 through pipe 49.

In operation, air received by the dryer 10 through port 32 flows through coalescer element 34 in a generally outward radial direction. Element 34 has a sufficient density to coalesce any oil mist particles in the received air into droplets at least large enough so that they will be removed from the air flow by filter 36. However, most oil droplets will be sufficiently large so that they will be removed from the air flow by gravity and fall into the sump 46. Since air flows through coalescer element 34 in an in to out direction, the air must flow over a relatively long path from coalescer 34 before reaching filter 36. This long path maximizes the time during which gravity can draw oil droplets out of the air flow and into sump 46. The remaining, coalesced oil droplets are removed from the air flow by filter 36. Water vapor is removed from the filtered air by the desiccant material held in housing 12. The filtered, dryed air provided by the device 10 is then transmitted to a storage tank (not shown) where it is stored until needed to operate the air brakes. The dryer 10 has an extremely long operating life because oil mist does not reach the desiccant material and therefore cannot contaminate that material. Further, the oil that collects on filter 36 can be readily cleaned from that filter by a reverse air flow through the dryer 10. For example, pressure sensitive apparatus disposed downstream from the dryer 10 may simultaneously open purge valve 47 and generate a reverse air flow through dryer 10 whenever a sufficient quantity of air has been transmitted through the dryer 10 to raise the downstream air pressure above a predetermined level. The dryer 10 will thus be periodically drained and cleaned by a reverse air flow.

FIG. 3 illustrates a modified absorptive dryer 50 for a compressed air brake system that differs from the dryer 10 illustrated in FIG. 1 in that the dryer 50 includes a flow straightener 52 for providing a laminar flow and for directing that laminar flow to strike the side wall of cylindrical housing 12. Flow straightener 52 comprises a plurality of tubes or conduits 54 (FIG. 4) having a sufficient length to diameter ratio to eliminate turbulence from received air and provide a laminar flow. In order to provide a laminar flow, the individual tubes forming the flow straightener 52 have a length of at least 10 times the diameter of those tubes. The tubes may of course be longer than this, and in many embodiments will have a length greater than 20 times the diameter of the tubes. The flow straightener 52 may be formed either from a plurality of individual tubes as illustrated, or from a cylindrically wound sheet of corrugated metallic material. Oil droplets are removed from the laminar air flow provided by flow straightener 52 as that laminar air flow impacts against cylinder 12.

The dryer 50 also includes a bent metal washer 56 that covers the top of coalescer 34. One wall 58 of washer 56 is bent so that washer 56 does not cover one small portion 60 near the edge of coalescer element 34. Wall 58 of washer 56 directs oil droplets flowing down the sides of cylindrical housing 12 to flow vertically through portion 60 of coalescer element 34 into sump 46. The lower part of wall 58 is impervious so that oil will collect above portion 60 of coalescer element 34 and will not flow along the top of coalescer element 34 toward the inner edge of that element. The uncovered portion 60 of coalescer element 34 is small so that only a small portion of the air received by dryer 50 will flow through portion 60 of coalescer 34. The upper part of wall 58 is perforated so that the major portion of the air received by the dryer 50 will flow through coalescer element 34 along a substantially horizontal in to out path similar to the flow path through the coalescer element of the dryer 10 illustrated in FIG. 1.

In operation, flow straightener 52 removes turbulence from received air and directs a laminar air flow to impact against the side wall of cylindrical housing 12. The impacting air flow causes oil mist particles in that flow to combine and form larger droplets which run down the side of housing 12. These droplets collect above portion 60 of coalescer element 34 and flow through that element to sump 46. The portion 60 of coalescer element 34 has a minimum vertical dimension which minimizes the flow resistance encountered by the oil droplets. In addition, a portion of the air flowing through the dryer 50 flows through portion 60 of coalescer 34 and pushes these oil droplets through the coalescer element. The major portion of the air received by dryer 50 does not pass through portion 60 of coalescer element 34, but is instead directed along a longer path through that element in order to maximize the coalescence of any oil mist particles in the art. That is, the major portion of the received air passes through the perforations in the upper part of wall 58 and flows along a radial in-to-out path through element 34 similar to the flow path through the coalescer element of dryer 10. Coalesced oil droplets are removed from the air flow by gravity and by filter 36. Water vapor is removed from the air flow by the desiccant material held in housing 12.

Having thus described two embodiments of this invention, a number of modifications will occur to those skilled in the art. For example, a compressed air brake system may be constructed having coalescer and filter elements such as elements 34 and 36 disposed a substantial distance from the desiccant material at the inlet to the air compressor.

Therefore, what is claimed is:

1. An absorptive dryer for an air-brake system comprising:

a desiccant material for removing moisture from air in the air-brake system;

a filter disposed upstream from said desiccant material for preventing contaminant particles from reaching said desiccant material;

a coalescer disposed upstream from said filter to coalesce any oil mist particles in the air brake system to at least a sufficiently large size to be readily removed from the air flow to said desiccant material by said filter;

said coalescer element comprising an endless element having an open core;

said filter element being disposed within the core of said coalescer element to minimize the overall size of the dryer;

said coalescer element coalescing oil mist particles into droplets of sufficiently large size to be removed by gravity from the air flowing through the absorptive dryer to thereby minimize the amount of oil striking and contaminating said filter element;

said absorptive dryer further including wall means for directing air through said coalescer element substantially along a direction away from said filter element to maximize the flow path between said coalescer and said filter elements and thereby maximize the gravity separation of oil droplets from the air flow;

a sump disposed beneath said coalescer and filter elements to collect said large droplets;

a first housing;

a second housing disposed within said first housing, said second housing containing said desiccant material, the walls of said second housing being spaced from the walls of said first housing;

a plurality of air transmitting conduits having sufficiently small diameters to provide a laminar air flow, said conduits directing said laminar air flow to strike said second housing at a position above said coalescer element, said laminar flow striking said second housing causing oil droplets carried by said air to combine into droplets of sufficiently large size to be removed by gravity from the air flowing through the absorptive dryer; and flow directing means for directing said droplets provided by said laminar flow striking said cylindrical housing to flow through said coalescer element along a short vertical path to minimize the flow resistance encountered by said droplets, said flow directing means providing only a small opening to said short vertical path and directing a major portion of the air received by the absorptive dryer to flow through said coalescer element along a long, substantially horizontal path in order to maximize the coalescence of oil mist particles.

* * * * *